Aug. 30, 1960 — B. KARPES — 2,950,558

FISHING DEVICES

Filed July 2, 1957

INVENTOR.
BERNARD KARPES
BY Phreedy & Phreedy
HIS ATTORNEYS.

United States Patent Office 2,950,558
Patented Aug. 30, 1960

2,950,558
FISHING DEVICES
Bernard Karpes, 3946 W. Irving Park Road, Chicago, Ill.
Filed July 2, 1957, Ser. No. 669,649
1 Claim. (Cl. 43—17.2)

This invention relates to new and useful improvements in fishing devices and the primary object of this invention is to provide a device of a simple construction which will facilitate retrieving the hook or plug and the line when the same become snagged on a log or other submerged object.

Another important object of this invention is to provide a retriever for the purposes hereinafter more fully set forth, which is simple in structure and one which can be readily associated with a retriever pole and line for effectively disconnecting the snagged hook and line which has become caught on a submerged object such as a log, weed, or other debris.

Yet another and equally important object of the invention is the provision of a retriever of the character hereinafter described which is of a structure such as permits the same to be disassembled when not in use and stored in a conventional fishing kit or the like.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
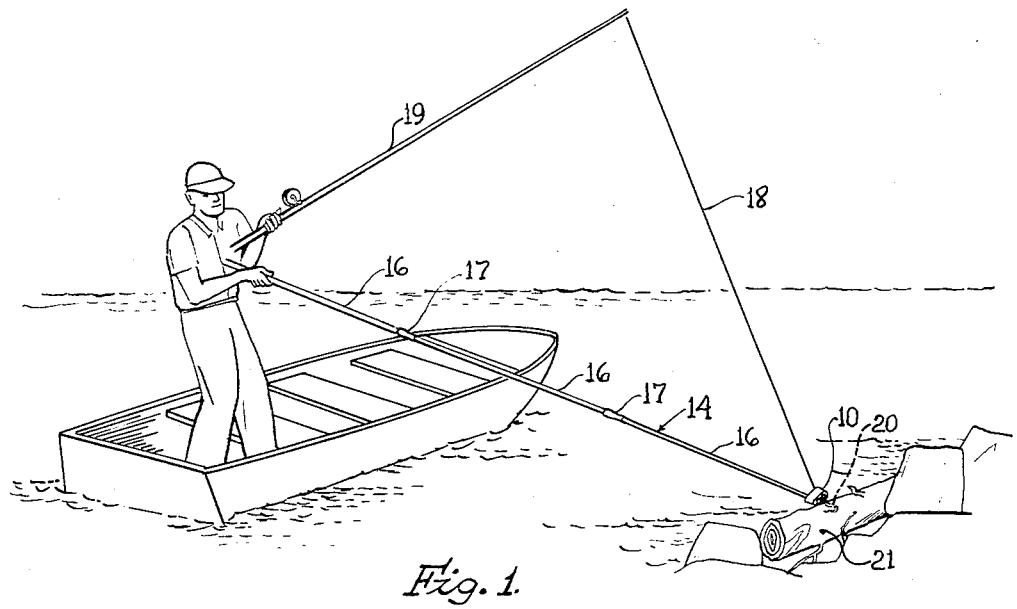
Fig. 1 is a perspective view showing the manner and use of my improved retriever.

The several objects of my invention are preferably accomplished by the preferred form of construction shown in the accompanying drawings in which my improved retriever is indicated at 10. This retriever may be made in various sizes and shapes and is of a form to provide a tapered opening 12 therethrough for the reception of the end 13 of a retriever pole 14.

Spaced from the opening 12 and extending in parallel relation with respect thereto, is an opening 12'. An entrance slot 15 is formed diagonally in the body 10 and has communication with the opening 12'.

The retriever pole may be of any approved construction and is preferably made in sections 16 telescopically connected together as at 17.

In use the end 13 of the retriever pole 14 is wedged into the opening 12 so as to securely connect the retriever body 10 to the pole 14.

The fishing line 18 is then passed through the slot 15 for confinement in the opening 12'. As the slot 15 extends at an inclination with respect to the side walls of the body 10, the line cannot be self-removed from the opening 12'.

With the retriever body 10 associated with the fishing line 18, the fisherman holds the retriever pole 14 in one hand and by means of the other hand lifts the fishing rod 19 in a direction to render substantially taut the line 18. This permits the fisherman to move by means of the retriever pole 14 the retriever body 10 to a point where the hook 20 is caught on a log or other submerged object.

By manipulating the retriever body 10 in the area of the point of snagged engagement between the hook 20 and log 21, the fisherman can effectively and quickly disengage the hook 20 from the object to which it is snagged.

After this has been accomplished the fisherman draws in the retriever pole 14 to place within his immediate reach the retriever body 10, at which time he removes the body 10 from the line 18 by passing the line 18 outwardly through the slot 15.

As before stated, when the retriever is not in use the pole 14 may be dismantled and the retriever and pole may be stored away in a suitable fishing kit.

The form of the retriever body may vary according to the desire and convenience of manufacturing. It may also be formed of any suitable material such as will effectively serve the purpose. The end 13 of the pole while being shown as being wedged in the opening 12 of the retriever body 10, may obviously be thread-bearing and threaded into the opening 12 or there may be a suitable set screw provided for securely attaching the body 10 to the end 13 of the pole 14.

Figure 2:
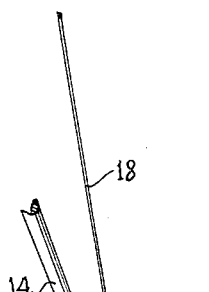
Fig. 2 is a fragmentary perspective view showing the retriever in position to disengage a snagged hook from an object.
Figure 3:
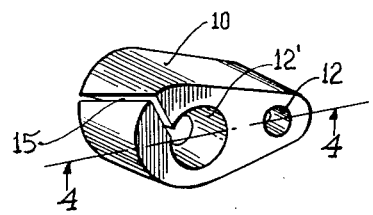
Fig. 3 is a perspective view of the retriever.
Figure 4:
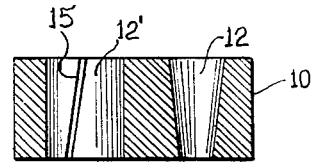
Fig. 4 is a sectional detail view taken substantially on line 4—4 of Fig. 3.
Figure 5:
Fig. 5 is an elevational view of a retriever pole partly in section.
Figure 6:
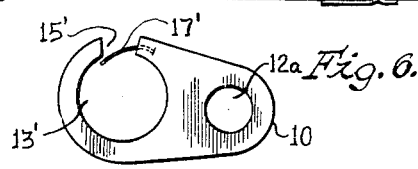
Fig. 6 is an elevational view of a modified form of retriever.

In the form shown in Fig. 6, I have arranged at the slot 15' of that form of construction, a leaf spring 17', which normally closes the slot to prevent outward movement of the line from the opening 13'. This form of construction is otherwise the same as the form shown in Figs. 1 and 2 inclusive.

From the foregoing description, it is obvious that I provide a simple form of retriever, one which is effective for its intended purpose and capable of being easily manipulated during the retrieving operation. The simplicity of my device permits the same to be manufactured at an economical cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A fishing hook retriever comprising a wedge shaped body having two parallelly extending spaced apart openings formed therethrough extending transversely with respect to the longitudinal length of said body, with one of said openings being tapered throughout its longitudinal length and extending through the narrow portion of said wedge shaped body, said body having a slot formed in one wall thereof and extending diagonally about a portion of the periphery of said body and in open communication with the other of said openings, said other of said openings being larger than said one opening and extending through the wider portion of said wedge shaped body, said slot providing a fishing line entrance to said other of said openings and said tapered opening providing a frictional connection between said body and a retrieving pole so that said body will extend at a right angle to the end of the pole, with the wider portion of the body and said other of said openings disposed in spaced parallel side relation to the pole.

References Cited in the file of this patent

UNITED STATES PATENTS

| | | |
|---|---|---|
| 1,215,073 | Stevens | Feb. 6, 1917 |
| 1,851,370 | Munger | Mar. 29, 1932 |
| 2,467,269 | Miller | Apr. 12, 1949 |
| 2,560,723 | Hansen | July 17, 1951 |
| 2,768,462 | Younce | Oct. 30, 1956 |
| 2,779,120 | Moore | Jan. 29, 1957 |